United States Patent
Xin et al.

(10) Patent No.: US 11,764,836 B2
(45) Date of Patent: Sep. 19, 2023

(54) LINK ADAPTATION CONTROL FOR EXTREMELY HIGH THROUGHPUT SYSTEMS

(71) Applicants: Yan Xin, Kanata (CA); Jung Hoon Suh, Kanata (CA); Osama Aboul-Magd, Kanata (CA); Kwok Shum Au, Ottawa (CA)

(72) Inventors: Yan Xin, Kanata (CA); Jung Hoon Suh, Kanata (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/506,050

(22) Filed: Oct. 20, 2021

(65) Prior Publication Data
US 2023/0121274 A1   Apr. 20, 2023

(51) Int. Cl.
*H04L 1/02* (2006.01)
*H04B 7/0417* (2017.01)
(Continued)

(52) U.S. Cl.
CPC ......... *H04B 7/0417* (2013.01); *H04B 7/0452* (2013.01); *H04W 88/08* (2013.01)

(58) Field of Classification Search
CPC . H04W 88/08; H04W 80/02; H04W 72/0426; H04W 40/244; H04W 72/0433;
(Continued)

(56) References Cited

U.S. PATENT DOCUMENTS 10,560,242 B2 * 2/2020 Chun ............... H04L 69/22
11,382,101 B1 * 7/2022 Chu ................. H04W 72/0453
(Continued)

FOREIGN PATENT DOCUMENTS

| CN | 113395145 A | 9/2021 |
|---|---|---|
| WO | 2020175299 A1 | 9/2020 |

OTHER PUBLICATIONS

IEEE 802.11ax-2021—IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications; Amendment 1: Enhancements for High-Efficiency WLAN, IEEE Std 802.11ax™-2021, 767 pages.
(Continued)

*Primary Examiner* — Khai Tran

(57) ABSTRACT

The application relates to link adaptation for extremely high throughput (EHT) systems. Various approaches are provided to enable transmission of link adaptation parameters for single-user multiple input multiple output (SU-MIMO), and multi-user multiple input multiple output MU-MIMO. In some embodiments, two control IDs in the A-control subfield are used, one for SU-MIMO and one for MU-MIMO. These can both be reserved control IDs, or a combination of a reserved control ID and control ID 2 normally used for HE link adaptation. In some embodiments, a single control ID in the A-control subfield is used. This can be a reserved control ID or control ID 2 normally used for HE link adaptation.

18 Claims, 10 Drawing Sheets

(51) Int. Cl.
*H04W 88/08* (2009.01)
*H04B 7/0452* (2017.01)

(58) Field of Classification Search
CPC ............. H04L 1/0003; H04L 1/0009; H04L 2001/0093; H04B 7/0695; H04B 7/0452
USPC ........................................ 375/267, 260, 262
See application file for complete search history.

(56) References Cited

U.S. PATENT DOCUMENTS

| | | |
|---|---|---|
| 2019/0280831 A1 | 9/2019 | Chu et al. |
| 2021/0211221 A1 | 7/2021 | Cao et al. |
| 2021/0337537 A1* | 10/2021 | Chun ............... H04W 72/048 |
| 2022/0053559 A1* | 2/2022 | Jang ............... H04W 74/0808 |
| 2022/0216937 A1* | 7/2022 | Veerashetty ............ H04L 1/0003 |

OTHER PUBLICATIONS

Wook Bong Lee et al., Considerations on Capabilities and Operation Mode: MU-MIMO, IEEE 802.11-21/0102r5, Jan. 18, 2021, 21 pages.

IEEE 802.11 ™-2020, Part 11: Wireless LAN Medium Access Control (MAC) and Physical Layer (PHY) Specifications (Ch.9.2.3).

IEEE P802.11be™/D1.1, Part 11: Wireless LAN Medium Access Control (MAC) and Physical Layer (PHY) Specifications, Amendment 8: Enhancements for extremely high throughput (EHT) (Ch. 9.2.4.6.3a HE variant), Jul. 2021, 685 pages.

\* cited by examiner

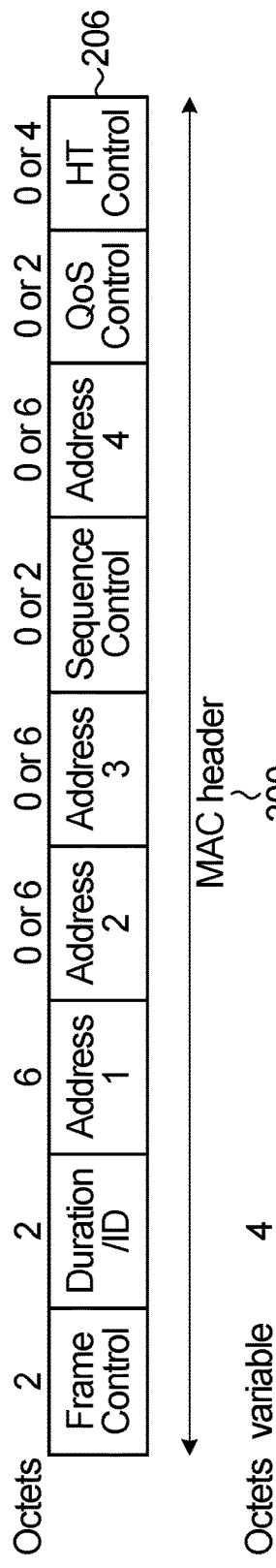

| Control ID value | Meaning | Length of the Control Information subfield (bits) | Content of the Control Information subfield |
|---|---|---|---|
| 0 | Triggered response scheduling (TRS) | 26 | TRS Control |
| 1 | Operating mode (OM) | 12 | OM Control |
| 2 | HE link adaptation (HLA) | 26 | HLA Control |
| 3 | Buffer status report (BSR) | 26 | BSR Control |
| 4 | UL power headroom (UPH) | 8 | UPH Control |
| 5 | Bandwidth query report (BQR) | 10 | BQR Control |
| 6 | Command and status (CAS) | 8 | CAS Control |
| 7 | EHT operating mode (EHT OM) | 6 | EHT OM Control |
| 8 | Single response scheduling (SRS) | 10 | SRS Control |
| 10 | AP assistance request (AAR) | 20 | AAR Control |
| 9, 11–14 | Reserved | | |
| 15 | Ones need expansion surely (ONES) | 26 | Set to all 1s |

| | B0 | B1 | B2 B4 | B5 B8 | B9 | B10 B17 |
|---|---|---|---|---|---|---|
| | Unsolicited MFB | MRQ | Nss | HE-MCS | DCM | RU Allocation |
| Bits: | 1 | 1 | 3 | 4 | 1 | 8 |

500 ⌒ 502 ⌒

| | B18 B19 B20 | B22 | B23 | B24 | B25 |
|---|---|---|---|---|---|
| | BW | MSI/Partial PPDU Parameters | TX Beamforming | UL HE TB PPDU MFB | Reserved |
| Bits: | 2 | 3 | 1 | 1 | 1 |

| B0 | B1 | B2 B5 | B6 B9 | B10 B18 |
|---|---|---|---|---|
| Unsolicited MFB | MRQ | Nss for SU MIMO | EHT-MCS for SU MIMO | RU Allocation |
| 1 | 1 | 4 | 4 | 9 |

Bits:

| B19 B21 | B22 B23 | B24 | B25 |
|---|---|---|---|
| BW | MSI/Partial PPDU Parameters | TX Beamforming | UL EHT TB PPDU MFB |
| 3 | 2 | 1 | 1 |

Bits:

FIG. 7

| B0 | B1 | B2 B3 | B4 B5 | B6 B9 | B10 B18 |
|---|---|---|---|---|---|
| Unsolicited MFB | MRQ | Nss for MU MIMO | Reserved | EHT-MCS for MU MIMO | RU Allocation |
| 1 | 1 | 2 | 2 | 4 | 9 |

Bits:

| B19 B21 | B22 B23 | B24 | B25 |
|---|---|---|---|
| BW | MSI/Partial PPDU Parameters | TX Beamforming | UL EHT TB PPDU MFB |
| 3 | 2 | 1 | 1 |

Bits:

FIG. 9

| B0 | B1 B2 | | B5 B6 | | B9 B10 | | B18 |
|---|---|---|---|---|---|---|---|
| Unsolicited MFB | MRQ | NSS | | EHT-MCS | | RU Allocation/(Partial RU Allocation, SU/MU-MIMO) | |
| Bits: | 1 | 1 | 4 | | 4 | | 9 |

| B19 B21 B22 | | B23 | | B24 | B25 |
|---|---|---|---|---|---|
| BW | | MSI/(PPDU Format, Coding Type)/(PPDU Format, SU/MU-MIMO) | | TX Beamforming | UL EHT TB PPDU MFB |
| Bits: | 3 | | 2 | 1 | 1 |

FIG. 10A

| B10 | B17 | B18 |
|---|---|---|
| Partial RU Allocation | | SU/MU-MIMO |
| Bits: | 8 | 1 |

FIG. 10B

| B10 | B18 |
|---|---|
| RU Allocation | |
| Bits: | 9 |

FIG. 11A

| B22 | B23 |
|---|---|
| MSI | |
| 2 | |

Bits:

FIG. 11B

| B22 | B23 |
|---|---|
| PPDU Format | Coding Type |
| 1 | 1 |

Bits:

FIG. 11C

| B22 | B23 |
|---|---|
| PPDU Format | SU/MU-MIMO |
| 1 | 1 |

Bits:

LINK ADAPTATION CONTROL FOR EXTREMELY HIGH THROUGHPUT SYSTEMS

TECHNICAL FIELD

The application relates to link adaptation for extremely high throughput (EHT) systems.

BACKGROUND

Link adaptation, comprising adaptive coding and modulation (ACM) and others (such as Power Control), is a term used in wireless communications to denote the matching of the modulation, coding and other signal and protocol parameters to the conditions on the radio link (e.g. the pathloss, the interference due to signals coming from other transmitters, the sensitivity of the receiver, the available transmitter power margin, etc.).

Link adaptation in wireless local area networks (WLANs) involves the transmission of link adaptation parameters from the transmitter to the receiver. Existing methods of transmitting link adaptation parameters, for example for high throughput (HT), very high throughput (VHT), and high efficiency (HE) variants are not sufficient for use in new EHT systems.

SUMMARY

The application relates to link adaptation for extremely high throughput (EHT) systems. Various approaches are provided to enable transmission of link adaptation parameters for single-user multiple input multiple output (SU-MIMO), and multi-user multiple input multiple output MU-MIMO. In some embodiments, two control IDs in the A-control subfield are used, one for SU-MIMO and one for MU-MIMO. These can both be reserved control IDs, or a combination of a reserved control ID and control ID 2 normally used for HE link adaptation. In some embodiments, a single control ID in the A-control subfield is used. This can be a reserved control ID or control ID 2 normally used for HE link adaptation.

According to one aspect of the present disclosure, there is provided a method that involves communicating, by a wireless communication device, a medium access control (MAC) frame comprising a MAC header, frame body and frame check sequence. The MAC header has a high throughput (HT) control sub-field, the HT control sub-field containing a control ID value and control information. When the control ID value is set to a first value, the control information is extremely high throughput (EHT) link adaptation parameters for EHT communication for single user-multiple input multiple output (SU-MIMO). When the control ID value is set to a second value, the control information is EHT link adaptation parameters for EHT communication for multi-user-multiple input multiple output (MU-MIMO).

In some embodiments, the first value is one of 9, 11, 12, 13, 14 and the second value is a different one of 9, 11, 12, 13, 14.

In some embodiments, the first value is 2 and the second value is one of 9, 11, 12, 13, 14. When the first value is 2, the method further involves communicating an indication at the physical layer that the MAC frame is a frame of a next generation protocol of High Efficiency (HE) protocol.

According to another aspect of the present disclosure, there is provided a method that involves communicating, by a wireless communication device, a medium access control (MAC) frame comprising a MAC header, frame body and frame check sequence. The MAC header has a high throughput (HT) control sub-field, the HT control sub-field containing a control ID value and control information. When the control ID value is set to a first value, the control information contains EHT link adaptation parameters for EHT communication, and the control information contains an SU/MU-MIMO indication of whether the control information is for SU-MIMO or for MU-MIMO.

In some embodiments, the control information includes a bandwidth sub-field indicating a recommended bandwidth, and a resource unit (RU) allocation/(partial RU allocation, SU/MU-MIMO indication) subfield defined as follows: when the recommended PPDU bandwidth is larger than 20 MHz, a resource unit (RU) allocation/(partial RU allocation, SU/MU-MIMO indication) subfield containing only RU allocation; when the recommended PPDU bandwidth equals 20 MHz, an resource unit (RU) allocation/(partial RU allocation, SU/MU-MIMO indication) subfield containing a partial RU allocation and the SU/MU-MIMO indication.

In some embodiments, the control information includes an unsolicited modulation and coding scheme feedback (MFB) sub-field, a bandwidth sub-field indicating a recommended PPDU bandwidth, and a modulation and coding scheme Request Sequence Identifier (MSI)/(physical layer protocol data unit (PPDU) Format, Coding Type)/(PPDU Format, SU/MU-MIMO indication) subfield defined as follows: when the unsolicited MFB sub-field is 0, MSI/(PPDU Format, Coding Type)/(PPDU Format, SU/MU-MIMO indication) containing MSI; when the unsolicited MFB sub-field is 1 and the recommended PPDU bandwidth is 20 MHz, the MSI/(PPDU Format, Coding Type)/(PPDU Format, SU/MU-MIMO indication) containing PPDU format and coding type; when the unsolicited MFB sub-field is 1 and the recommended PPDU bandwidth is >20 MHz, the MSI/(PPDU Format, Coding Type)/(PPDU Format, SU/MU-MIMO indication) containing PPDU format and the SU/MU-MIMO indication.

In some embodiments, the first value is one of 9, 11, 12, 13, 14.

In some embodiments, the first value is 2 and the second value is one of 9, 11, 12, 13, 14. When the first value is 2, the method further involves communicating an indication at the physical layer that the MAC frame is a frame of a next generation protocol of a High Efficiency (HE) protocol.

In some embodiments, communicating involves transmitting by an access point (AP).

In some embodiments, communicating involves receiving by an access point.

In some embodiments, communicating involves transmitting by a non-access point (AP) station (STA).

In some embodiments, communicating involves receiving by a non-AP station (STA).

According to another aspect of the present invention, there is provided an access point that has a processor and memory. The access point is configured to execute a method that involves communicating, by the access point, a medium access control (MAC) frame comprising a MAC header, frame body and frame check sequence. The MAC header has a high throughput (HT) control sub-field, the HT control sub-field containing a control ID value and control information. When the control ID value is set to a first value, the control information is extremely high throughput (EHT) link adaptation parameters for EHT communication for single user-multiple input multiple output (SU-MIMO). When the control ID value is set to a second value, the control information is EHT link adaptation parameters for EHT communication for multi-user-multiple input multiple output (MU-MIMO).

In some embodiments, the first value is one of 9, 11, 12, 13, 14 and the second value is a different one of 9, 11, 12, 13, 14.

In some embodiments, the first value is 2 and the second value is one of 9, 11, 12, 13, 14. When the first value is 2, the method further involves communicating an indication at the physical layer that the MAC frame is a frame of a next generation protocol of High Efficiency (HE) protocol.

According to another aspect of the present invention, there is provided a non-AP station having a processor and memory. The non-AP station is configured to execute a method that involves communicating, by the non-AP station, a medium access control (MAC) frame comprising a MAC header, frame body and frame check sequence. The MAC header has a high throughput (HT) control sub-field, the HT control sub-field containing a control ID value and control information. When the control ID value is set to a first value, the control information is extremely high throughput (EHT) link adaptation parameters for EHT communication for single user-multiple input multiple output (SU-MIMO). When the control ID value is set to a second value, the control information is EHT link adaptation parameters for EHT communication for multi-user-multiple input multiple output (MU-MIMO).

In some embodiments, the first value is one of 9, 11, 12, 13, 14 and the second value is a different one of 9, 11, 12, 13, 14.

In some embodiments, the first value is 2 and the second value is one of 9, 11, 12, 13, 14. When the first value is 2, the method further involves communicating an indication at the physical layer that the MAC frame is a frame of a next generation protocol of High Efficiency (HE) protocol.

BRIEF DESCRIPTION OF THE DRAWINGS

Reference will now be made, by way of example, to the accompanying drawings which show example embodiments of the present application, and in which:

FIG. 2 depicts the format of a medium access control (MAC) frame format of 802.11;

FIG. 3A depicts the format of the HT control field for high throughput (HT), very high throughput (VHT), and high efficiency (HE) variants;

FIG. 3B depicts the format of the A-control subfield;

FIG. 4 is a table showing the meaning of the control ID subfield value;

FIG. 5 depicts a format for the HLA control subfield;

FIG. 6 depicts an example format for the Control Information subfield in EHT LA-SU MIMO;

FIG. 7 depicts an example format for the Control Information subfield in EHT LA-MU MIMO;

FIG. 9 depicts an example format for the Control Information subfield in EHT LA for SU-MIMO or MU-MIMO;

FIGS. 10A and 10B depict an example format for the RU Allocation/(Partial RU Allocation, SU/MU-MIMO) subfield;

FIGS. 11A, 11B and 11C depict an example format for the MSI/(PPDU Format, Coding Type)/(PPDU Format, SU/MU-MIMO) subfield.

DETAILED DESCRIPTION

To assist in understanding the present disclosure, an example system supporting wireless communications over air interfaces is first described.

Figure 1A:
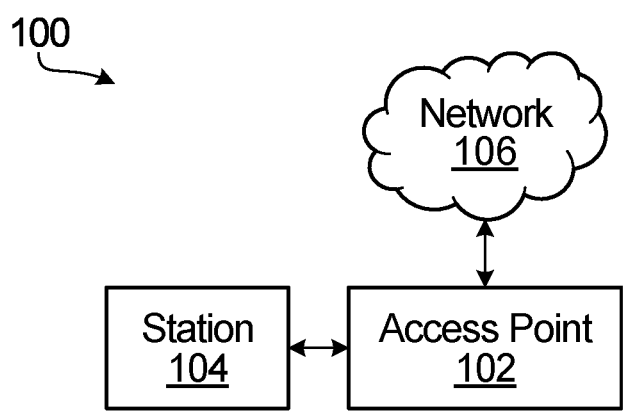
FIG. 1A is a schematic diagram illustrating an example system for extremely high throughput (EHT) communications between a STA and the network.

FIG. 1A is a schematic diagram of an example system 100 in which methods described herein may be implemented. The system 100 shown in FIG. 1A may support a wireless local area network (WLAN) including an access point (AP) 102 and multiple stations (STAs) 104 within coverage of the AP 102. In the example shown, there is only one STA 104 and one AP 102, however there may be multiple STAs 104 and/or multiple APs 102. Each STA 104 may be any suitable device capable of wireless communication, including mobile or stationary devices such as smartphones, laptops, mobile phones or tablet devices, for example, and the STAs 104 need not be the same as each other. The STAs 104 may also be referred to as terminals, user devices, user equipment (UE) or clients, for example. The AP 102 may be also referred to as a base station. The AP 102 may be implemented as a router, for example. The STA 104 may access a network 106 via the AP 102.

The system 100 may support communication between the AP 102 and each STA 104, as well as communication directly between STAs 104 (also referred to as device-to-device communication). Using multiple antennas, the AP 102 may carry out multi-user transmissions (e.g., transmissions from the AP 102 to multiple STAs 104 simultaneously) by using the spatial reuse technique of multi-user multiple-input multiple-output (MU-MIMO). For simplicity, examples described herein may refer to wireless communications over air interfaces between a STA 104 and an AP 102, however it should be understood that the present disclosure may be equally applicable to wireless communications over air interfaces between two STAs 104, multi-user communications (e.g., between an AP 102 and multiple STAs 104), or any other wireless communications over air interfaces.

Figure 1B:
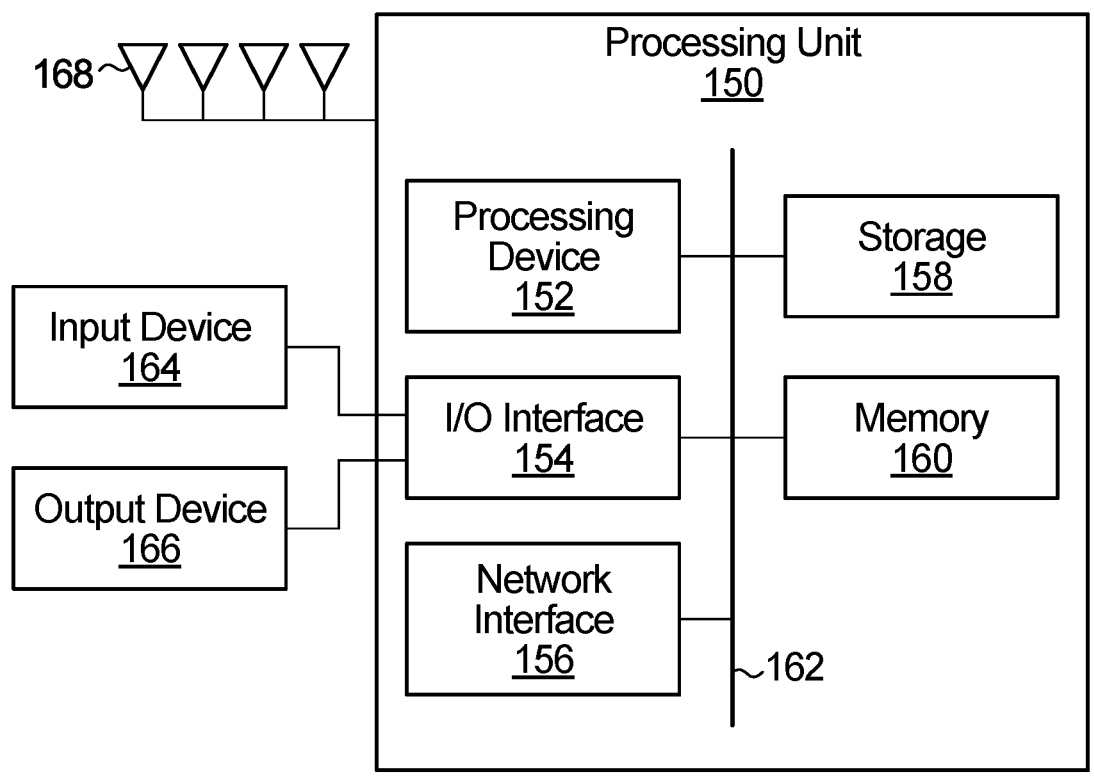
FIG. 1B is a block diagram illustrating an example device suitable for WLAN communications.

FIG. 1B is a block diagram illustrating an example processing unit 150, which may be used to implement the methods and systems disclosed herein, for example the AP 102 and/or one or more of the STAs 104. Other processing units suitable for implementing the present disclosure may be used, which may include components different from those discussed below. Although FIG. 1B shows a single instance of each component, there may be multiple instances of each component in the processing unit 150.

The processing unit 150 includes one or more processing devices 152, such as a processor, a microprocessor, an application-specific integrated circuit (ASIC), a field-programmable gate array (FPGA), a dedicated logic circuitry, or combinations thereof. The processing unit 150 may also include one or more input/output (I/O) interfaces 154, which may enable interfacing with one or more appropriate input devices 164 and/or output devices 166. The processing unit 150 includes one or more network interfaces 156 for wired or wireless communication with the network 106 (e.g., an intranet, the Internet, a P2P network, a WAN, a LAN, and/or a Radio Access Network (RAN)). The network interface(s) 156 may include wired links (e.g., Ethernet cable) and/or wireless links for intra-network and/or inter-network communications. The network interface(s) 156 may provide wireless communication via one or more transmitters/receivers or transceiver antennas 168, for example. The antennas 168 may act together as an antenna array, in which case each antenna 168 may be referred to as an antenna element or radiating element of the antenna array. There may be a plurality of such antenna arrays. The processing unit 150 may also include one or more storage units 158, which may include a mass storage unit such as a solid state drive, a hard disk drive, a magnetic disk drive and/or an optical disk drive.

The processing unit 150 may include one or more memories 160, which may include a volatile or non-volatile memory (e.g., a flash memory, a random access memory (RAM), and/or a read-only memory (ROM)). The non-transitory memory(ies) 160 may store instructions (e.g., in the form of software modules) for execution by the processing device(s) 152, such as to carry out the methods described in the present disclosure. For example, instructions for implementing a logical layer for supporting MLA (as described further below) may be stored in the memory(ies) 160.

The memory(ies) 160 may include other software instructions, such as for implementing an operating system and other applications/functions. In some examples, one or more data sets and/or module(s) may be provided by an external memory (e.g., an external drive in wired or wireless communication with the processing unit 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 162 providing communication among components of the processing unit 150, including the processing device(s) 152, I/O interface(s) 154, network interface(s) 156, storage unit(s) 158 and/or memory(ies) 160. The bus 162 may be any suitable bus architecture including, for example, a memory bus, a peripheral bus or a video bus.

In FIG. 1B, the input device(s) 164 (e.g., a keyboard, a mouse, a microphone, a touchscreen, and/or a keypad) and output device(s) 166 (e.g., a display, a speaker and/or a printer) are shown as external to the processing unit 150. In other examples, one or more of the input device(s) 164 and/or the output device(s) 166 may be included as a component of the processing unit 150. In other examples, there may not be any input device(s) 164 and output device(s) 166, in which case the I/O interface(s) 154 may not be needed.

The AP 102 and STAs 104 may each include multiple antenna elements 168 forming antenna arrays, and may carry out appropriate beamforming and beam steering controls (e.g., using beamsteering circuits and/or beamsteering control modules implemented by the processing device 152 and processing unit 150), in order to carry out wireless communication over air interfaces.

FIG. 2 depicts the format of a medium access control (MAC) frame format of 802.11. The frame format includes a MAC header 200, frame body 202 and frame check sequence 204. Among other fields, the MAC header 200 includes a high throughput (HT) control field 206.

The HT control field 206 is present in a Control Wrapper frame, QoS Data frame, and QoS Null frames, and is also present in management frames as determined by the +HTC subfield of the frame control field in MAC header 200. The format of the HT control field is defined as shown in FIG. 3A for high throughput (HT), very high throughput (VHT), and high efficiency (HE) variants. For the HT variant, the fields include HT Control Middle, AC (access control) Constraint, RDG (Reverse Direction Grant)/More PPDU (PHY Protocol Data Unit). For the VHT variant, the fields include VHT Control Middle, AC Constraint, RDG/More PPDU. For the HE variant, the fields include A-Control.

The HT Control field for the VHT and HE variants carry link adaptation (LA) parameters. For the HE variant, these are carried in the A-Control subfield, as detailed below.

The A-Control subfield is 30 bits long. The format of the A-Control subfield is shown in FIG. 3B, and includes a 4-bit control ID, and maximum 26-bit control information.

FIG. 4 is a table showing the meaning of the control ID subfield value defined in 802.11be D1.0. The control ID value is indicated in column 400, corresponding meaning in column 402, length of control information subfield in column 404, and content of the subfield in column 406. Different control ID values are assigned to indicate 11 different control information subfields.

The remaining 26 bits beyond the 4-bit control ID are used for the control information in the A-Control subfield. As can be seen from the length of control information indicated in column 404, some control IDs do not fully utilize all 26 bits of the control information subfield, and in this case, the remainder of the control information subfield is padded with zeros. The control ID value of "2" with 4-bit binary representation "0010" indicates a control frame contains an HLA control subfield. In this type of control field, the full 26 bits are allocated for control information without zero padding.

FIG. 5 depicts the HLA control subfield format specified in 802.11ax, which shows how 26 bits are utilized for the indication of HE link adaptation (HLA) parameters. Among other parameters, the HLA parameters include one parameter to indicate a number of spatial streams, namely parameter Nss 500 and one parameter to indicate modulation and coding scheme (MCS), namely parameter HE-MCS 502.

The 30-bit A-Control subfield of the HT Control field is not large enough to carry additional LA parameters for EHT such as separate Nss parameters for single user-multiple input multiple output (SU-MIMO) and multi-user MIMO (MU-MIMO), and separate MCS parameters for SU-MIMO and MU-MIMO.

EHT Link Adaptation (EHT LA) Using Two Control ID Values in A-Control Subfield of the HE Variant HT Control Field—First Method In accordance with a first embodiment, as shown in Table 1 below, two reserved Control ID values in A-Control subfield are used to indicate two separate Control Information subfields for EHT LA related to SU MIMO and MU MIMO respectively. In the example shown in the table, Control IDs 11 and 12 are used for this purpose, but more generally, any available reserved control IDs can be used, for example, two control IDs from the currently unused set which includes control IDs 9, and 11 to 14. Control Information subfield for EHT LA includes 26 bits for either SU-MIMO or MU-MIMO configuration.

TABLE 1

Control ID and EHT LA in A-Control field in Embodiment 1

| Control ID Value | Meaning | Length of the Control Information subfield (bits) | Content of the Control Information subfield |
|---|---|---|---|
| ... | | | |
| 2 | HE link adaptation (HLA) | 26 | See 9.2.4.6a.3 (HLA control) in 802.11ax-2021 |
| ... | | | |
| 11 | EHT Link Adaptation (EHT LA) - SU MIMO | 26 | See below |
| 12 | EHT Link Adaptation (EHT LA) - MU MIMO | 26 | See below |

Control Information Subfield in EHT Link Adaptation (EHT LA)

An example of the content of Control Information subfield in EHT LA SU MIMO and in EHT LA MU MIMO that might be used for this embodiment is illustrated in FIGS. 6 and 7 respectively. However, it should be understood that this is just an example, and that different LA parameters for one or both of SU MIMO or MU MIMO may be used.

An example set of definitions for the EHT LA parameters in Control Information subfield included in the examples of FIGS. 6 and 7 is provided below for EHT LA in SU-MIMO or MU-MIMO.

Unsolicited modulation and coding scheme (MCS) feedback (MFB) (Unsolicited MFB indicator):
  Set to 1 if EHT LA Control is an unsolicited MFB.
  Set to 0 if EHT LA Control is an EHT LA feedback request indicator (MRQ) or a solicited MFB.

MRQ (EHT LA feedback request indicator):
  Set to 1 and set Unsolicited MFB to 0 to request an EHT LA feedback.
  Set to 0 and set Unsolicited MFB to 0 to respond to an EHT LA request.
  If the Unsolicited MFB is 1, the MRQ is reserved.

NSS for SU-MIMO (Recommended number of spatial streams for SU-MIMO):
  If the Unsolicited MFB is 1 and the UL EHT TB PPDU MFB (defined below) is 0 or if the Unsolicited MFB is 0 and the MRQ is 0, the NSS for SU-MIMO subfield indicates the recommended number of spatial streams to the PPDU sent to the STA, $N_{ss,su-mimo}$, and is set to $N_{ss,su-mimo}-1$. The range of $N_{ss,su-mimo}$ is 1 to 16.
  If the Unsolicited MFB is 1 and the UL EHT TB PPDU MFB is 1, the NSS subfield indicates the recommended number of spatial streams to the EHT TB PPDU sent from the STA, $N_{ss,su-mimo}$, and is set to $N_{ss,su-mimo}-1$
  Otherwise, this subfield is reserved.

NSS for MU-MIMO (Recommended number of spatial streams for MU-MIMO):
  If the Unsolicited MFB is 1 and the UL EHT TB PPDU MFB is 0 or if the Unsolicited MFB is 0 and the MRQ is 0, the NSS for MU-MIMO subfield indicates the recommended number of spatial streams to the PPDU sent to the STA, $N_{ss,mu-mimo}$, and is set to $N_{ss,mu-mimo}-1$. The range of $N_{ss,mu-mimo}$ is 1 to 4.
  If the Unsolicited MFB is 1 and the UL EHT TB PPDU MFB is 1, the NSS subfield indicates the recommended number of spatial streams to the EHT TB PPDU sent from the STA, $N_{ss,mu-mimo}$, and is set to $N_{ss,mu-mimo}-1$.
  Otherwise, this subfield is reserved.

EHT-MCS for SU-MIMO (Recommended EHT-MCS for SU-MIMO):
  If the Unsolicited MFB subfield is 1 and the UL EHT TB PPDU MFB subfield is 0 or if the Unsolicited MFB is 0 and the MRQ is 0, the EHT-MCS for SU-MIMO indicates the recommended EHT-MCS of the PPDU sent to the STA with SU-MIMO, and is set to the EHT-MCS index.
  If the Unsolicited MFB is 1 and the UL EHT TB PPDU MFB subfield is 1, the EHT-MCS for SU MIMO indicates the recommended EHT-MCS of the EHT TB PPDU sent from the STA in SU-MIMO, and is set to the EHT-MCS index.
  Otherwise, this subfield is reserved.

EHT-MCS for MU-MIMO (Recommended EHT-MCS for MU-MIMO):
  If the Unsolicited MFB subfield is 1 and the UL EHT TB PPDU MFB subfield is 0 or if the Unsolicited MFB is 0 and the MRQ is 0, the EHT-MCS for MU-MIMO indicates the recommended EHT-MCS of the PPDU sent to the STA with MU-MIMO, and is set to the EHT-MCS index.
  If the Unsolicited MFB is 1 and the UL EHT TB PPDU MFB subfield is 1, the EHT-MCS for MU MIMO indicates the recommended EHT-MCS of the EHT TB PPDU sent from the STA in MU-MIMO, and is set to the EHT-MCS index.
  Otherwise, this subfield is reserved.

RU Allocation (resource unit (RU)/multi-unit resource unit (MRU) of the recommended EHT-MCS/RU/MRU):
  If the Unsolicited MFB is 1 and the UL EHT TB PPDU MFB is 0, the RU Allocation subfield indicates the RU/MRU for which the recommended EHT-MCS applies to the PPDU sent to the STA.
  If the Unsolicited MFB is 0 and the MRQ is 1, the RU Allocation subfield indicates the RU/MRU requested by the MFB requester to get feedback.
  The RU Allocation is interpreted with the BW to specify the RU/MRU.
  If the Unsolicited MFB is 1 and the UL EHT TB PPDU MFB is 1, the RU Allocation indicates the RU/MRU for which the recommended EHT-MCS applies to the EHT TB PPDU sent from the STA and that the actual allocation of the RU/MRU can be ignored by the recipient.
  Otherwise, this subfield is reserved.

BW (Bandwidth of the recommended EHT-MCS/Bandwidth specified by MFB requester to get feedback):
  If the Unsolicited MFB is 1 and the UL EHT TB PPDU MFB is 0, the BW indicates the bandwidth for which the recommended EHT-MCS applies to the PPDU sent to the STA.
  If the Unsolicited MFB is 1 and the UL EHT TB PPDU MFB is 1, the BW indicates the bandwidth for which the recommended EHT-MCS applies to the EHT TB PPDU sent from the STA.
  If the Unsolicited MFB is 0 and the MRQ is 1, the BW indicates the bandwidth requested by the MFB requester to get feedback.
  Set to 0 for 20 MHz. Set to 1 for 40 MHz. Set to 2 for 80 MHz. Set to 3 for 160 MHz. Set to 4 for 320-1 MHz. Set to 5 for 320-2 MHz.
  Otherwise, this subfield is reserved.

MSI/Partial PPDU Parameters (Partial parameters of the measured PPDU/MRQ sequence identifier):
  If the Unsolicited MFB subfield is 0 and the MRQ subfield is 1, the MSI/Partial PPDU Parameters subfield contains a sequence number in the range 0 to 3 that identifies the specific EHT-MCS feedback request.
  If the Unsolicited MFB subfield is 0 and the MRQ subfield is 0, the MSI/Partial PPDU Parameters subfield contains a sequence number in the range 0 to 3 that responds to the specific solicited EHT-MCS feedback request.
  If the Unsolicited MFB subfield is 1, the MSI/Partial PPDU Parameters subfield contains the PPDU Format (1 bit for indication of EHT MU PPDU or EHT TB PPDU) and Coding Type (1 bit for indication of BCC or LDPC) subfields.
Tx Beamforming (Transmission type of the measured PPDU):
  If the Unsolicited MFB subfield is 1 and the UL EHT TB PPDU MFB subfield is 0, then the Tx Beamforming subfield indicates whether or not the PPDU from which the unsolicited MFB was estimated is beamformed.
  Set to 0 for non-beamformed PPDU
  Set to 1 for beamformed PPDU
  Otherwise, this subfield is reserved.
UL EHT TB PPDU MFB (UL EHT trigger-based (TB) PPDU MFB indication):
  If the Unsolicited MFB subfield is 1, a value of 1 in this subfield indicates that the NSS, EHT-MCS, BW and RU Allocation fields represent the recommended MFB for the EHT TB PPDU sent from the STA.
  Otherwise, this subfield is reserved.

The advantages of the first embodiment include maintaining the A-Control format and the definition for subfields in A-Control subfield for HE unchanged by using two reserved control ID values.

EHT Link Adaptation (EHT LA) Using Two Control ID Values in A-Control Subfield of the HE Variant HT Control Field—Second Method In accordance with a second embodiment, Control Information subfields in EHT LA field for SU-MIMO and MU-MIMO are indicated by the Control ID value equal to 2 (for HLA in 802.11ax) and by a reserved Control ID value (e.g., 11) in A-Control subfield, respectively. Control Information subfield for EHT LA includes 26 bits for either SU-MIMO or MU-MIMO configuration.

In this case, control ID 2 is used for both HLA and EHT LA for SU-MIMO. The transmitter and the receiver will distinguish between these two cases on some other basis, for example the length field in a legacy PHY header at the physical (PHY) layer. If this distinction can be made at the PHY layer, then the receiver will know by the time MAC layer processing is to be performed. More specifically, at the PHY layer, the transmitter and the receiver can determine whether the frame is HLA or EHT. In the example below, when TXVECTOR parameter FORMAT (a specific example of a PHY layer parameter) indicates an HE PPDU, this means the frame is HLA and control ID 2 is interpreted to indicate HLA LA parameters. On the other hand, when TXVECTOR parameter FORMAT indicates an EHT PPDU, this means the frame is EHT, and control ID 2 is interpreted to EHT LA for SU MIMO. More generally, an indication can be communicated at the physical layer that the MAC frame is a frame of a next generation protocol of a High Efficiency (HE) protocol, EHT being a specific example.

TABLE 2

Control ID and EHT LA in A-Control field in Second Embodiment

| Control ID Value | Meaning | Length of the Control Information subfield (bits) | Content of the Control Information subfield |
|---|---|---|---|
| 2 | HE link adaptation (HLA)/ EHT Link Adaptation (EHT LA) - SU MIMO | 26 | when TXVECTOR parameter FORMAT indicates an HE PPDU, use HLA when TXVECTOR parameter FORMAT indicates an EHT PPDU, use EHT LA - SU MIMO (see below) |
| 11 | EHT Link Adaptation (EHT LA) - MU MIMO | 26 | See below |

A specific example of the format of the Control Information subfield in EHT Link Adaptation (EHT LA) is one that is identical to the example for the first embodiment detailed above, but other formats may alternatively be used. Example definitions of EHT LA parameters in the Control Information subfield are as described for the first embodiment above.

An advantage of the second embodiment includes maintaining the A-Control format unchanged and using one existing Control ID for HLA and one reserved Control ID for indication of EHT LA.

Figure 8:
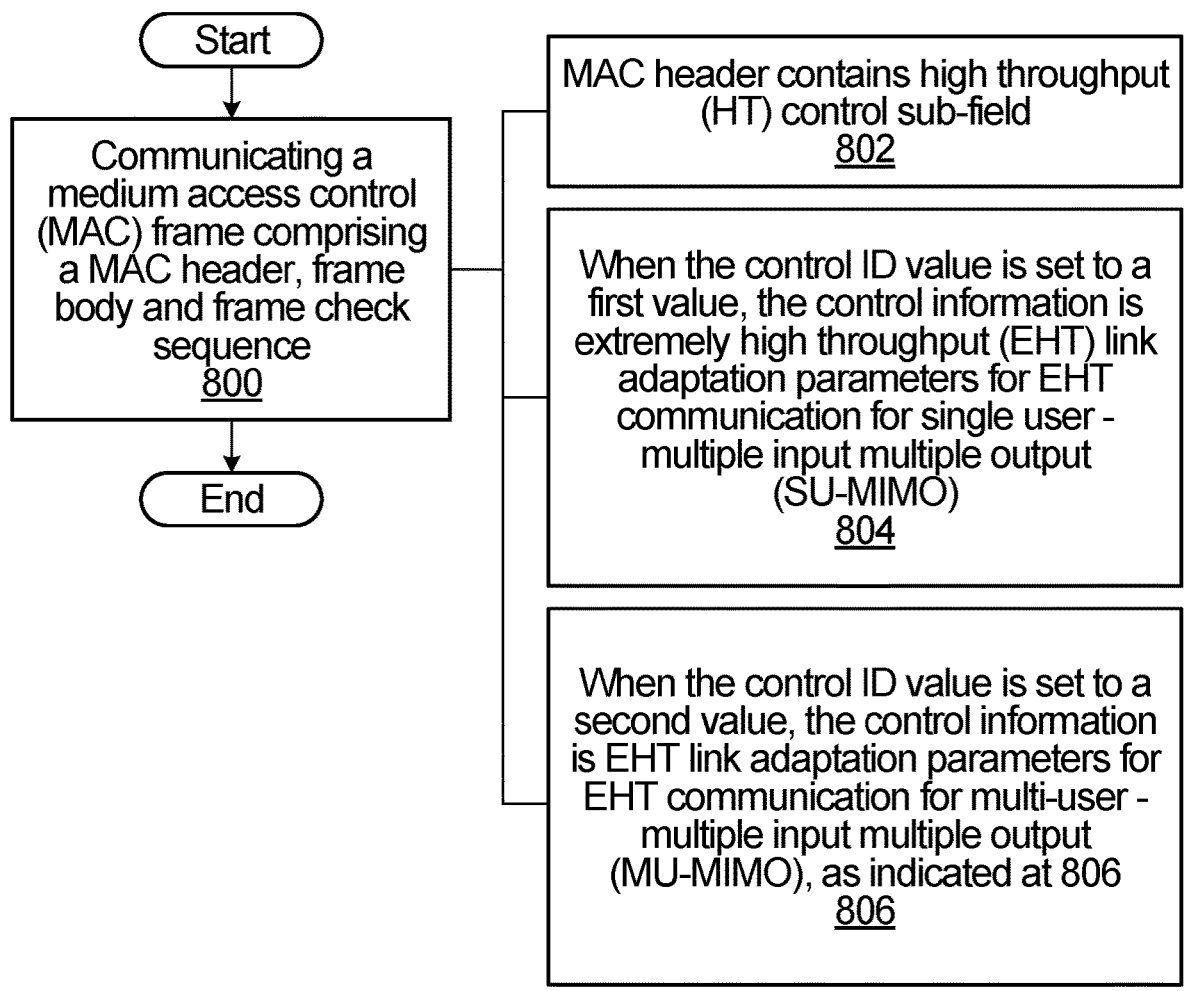
FIG. 8 is a flowchart of a method of communicating EHT LA parameters.

It can be seen that the first and second embodiments share the feature that two control IDs are used for EHT LA; one is used for SU-MIMO (this either being 2, or a reserved control ID) and another is used for MU-MIMO (this being a reserved control ID). A flowchart of a method that encompasses the first and second embodiment is depicted in FIG. 8. The method begins in block 800 with communicating, by a wireless communication device, a medium access control (MAC) frame comprising a MAC header, frame body and frame check sequence. The MAC header contains a high throughput (HT) control sub-field, the HT control sub-field containing a control ID value and control information as indicated at 802. When the control ID value is set to a first value, the control information is extremely high throughput (EHT) link adaptation parameters for EHT communication for single user-multiple input multiple output (SU-MIMO), as indicated at 804. When the control ID value is set to a second value, the control information is EHT link adaptation parameters for EHT communication for multi-user-multiple input multiple output (MU-MIMO), as indicated at 806.

In some embodiments, the first control ID is one of 9, 11, 12, 13, 14, and the second control ID is a different one of 9, 11, 12, 13, 14. In some embodiments, the first control ID is 2, and the second is one of 9, 11, 12, 13, 14. When the first value is 2, the method further involves communicating an indication at the physical layer that the MAC frame is a frame of a next generation protocol of High Efficiency (HE) protocol.

In FIG. 8, the communicating can involve receiving by an access point. Alternatively communicating can involve transmitting by an access point. The communicating can involve receiving by a non-AP station. Alternatively communicating can involve transmitting by a non-AP station.

EHT Link Adaptation (EHT LA) Using One Control ID Value in A-Control Subfield of the HE Variant HT Control Field—First Method In a third embodiment, one reserved Control ID value in A-Control subfield is used to indicate one Control Information subfield carrying EHT LA parameters related to SU-MIMO or MU-MIMO configuration. The Control Information subfield for EHT LA includes 26 bits. Included in the 26 bits is an SU/MU-MIMO indication (for example a single SU/MU-MIMO indication bit) that is used to signal whether the EHT LA parameters carried in the Control Information subfield are related to SU-MIMO or MU-MIMO. The position of the SU/MU-MIMO indication can vary depending on other factors. A specific example is provided below where this is the case. Control ID meanings for this example are depicted in Table 3 below, where control ID 2 is used as before for HE link adaptation, and a reserved control ID (11 in the example) is used for EHT link adaptation.

TABLE 3

Control ID and EHT LA in A-Control field in Third Embodiment

| Control ID Value | Meaning | Length of the Control Information subfield (bits) | Content of the Control Information subfield |
|---|---|---|---|
| . . . | | | |
| 2 | HE link adaptation (HLA) | 26 | See 9.2.4.6a.3 (HLA control) in 802.11ax-2021 |
| . . . | | | |
| 11 | EHT Link Adaptation (EHT LA) | 26 | See below |

A specific example of the content of Control Information subfield in EHT LA for SU-MIMO or MU-MIMO is illustrated in FIG. 9.

FIGS. 10A and 10B show a detailed breakdown of the RU Allocation/(Partial RU Allocation, SU/MU-MIMO) subfield. The content for the case where the recommended BW=20 MHz, is depicted in FIG. 10A. In this case, the RU allocation/(partial RU allocation, SU/MU-MIMO indication) subfield contains a partial RU allocation and the SU/MU-MIMO indication, using 8 bits and one bit in the illustrated example.

The content for the case where the recommended BW>20 MHz, is depicted in FIG. 10B. In this case, the RU allocation/(partial RU allocation, SU/MI-MIMO indication) subfield contains only RU allocation, 9 bits in the illustrated example.

FIGS. 11A, 11B and 11C show a detailed breakdown of the MSI/(PPDU Format, Coding Type)/(PPDU Format, SU/MU-MIMO) subfield, which varies as a function of unsolicited MFB subfield and the recommended BW subfield.

The content for the case where the unsolicited MFB subfield is 0 is depicted in FIG. 11A. In this case, the MSI/(PPDU Format, Coding Type)/(PPDU Format, SU/MU-MIMO) subfield simply contains MSI. Note that in this case, there is no need to indicate SU-MIMO or MU-MIMO configuration since a solicited MFB implies a STA knows the feedback type the requester requires with the identified specific HE-MCS feedback request or that responds to the specific solicited HE-MCS feedback request.

The content for the case where the Unsolicited MFB subfield is 1 and the recommended BW=20 MHz is depicted at in FIG. 11B. In this case the subfield contains PPDU format and coding type, using one bit each in the illustrated example.

The content for the case where the Unsolicited MFB subfield is 1 and the recommended BW>20 MHz is depicted at FIG. 11C. In this case, the subfield contains PPDU format and the SU/MU-MIMO indicator.

A specific example definition of the EHT LA parameters in Control Information subfield for this embodiment is provided below.

Unsolicited MFB (Unsolicited MFB indicator):
  Set to 1 if EHT LA Control is an unsolicited MFB.
  Set to 0 if EHT LA Control is an MRQ or a solicited MFB.
MRQ (EHT LA feedback request indicator):
  Set to 1 and set Unsolicited MFB to 0 to request an EHT LA feedback.
  Set to 0 and set Unsolicited MFB to 0 to respond to an EHT LA request.
  If the Unsolicited MFB is 1, the MRQ is reserved.
NSS (Recommended number of spatial stream for SU-MIMO or MU-MIMO)
  If the Unsolicited MFB is 1 and the UL EHT TB PPDU MFB is 0, and
  1) if SU/MU-MIMO subfield indicates SU-MIMO, the NSS subfield indicates the recommended number of spatial streams to the PPDU sent to the STA, $N_{ss,su-mimo}$, and is set to $N_{ss,su-mimo}-1$. The range of $N_{ss,su-mimo}$ is 1 to 16;
  2) if SU/MU-MIMO subfield indicates MU-MIMO, the NSS subfield indicates the recommended number of spatial streams to the PPDU sent to the STA, $N_{ss,mu-mimo}$, and is set to $N_{ss,mu-mimo}-1$. The range of $N_{ss,mu-mimo}$ is 1 to 4.
  If the Unsolicited MFB is 1 and the UL EHT TB PPDU MFB is 1, and
  1) If SU/MU-MIMO subfield indicates SU-MIMO, the NSS subfield indicates the recommended number of spatial streams to the EHT TB PPDU sent from the STA, $N_{ss,su-mimo}$, and is set to $N_{ss,su-mimo}-1$;
  2) If SU/MU-MIMO subfield indicates MU-MIMO, the NSS subfield indicates the recommended number of spatial streams to the EHT TB PPDU sent from the STA, $N_{ss,mu-mimo}$, and is set to $N_{ss,mu-mimo}-1$;
  if the Unsolicited MFB is 0 and the MRQ is 0, the NSS subfield indicates the recommended number of spatial streams to the PPDU sent to the STA for either SU-MIMO or MU-MIMO that can be identified by MSI.
  Otherwise, this subfield is reserved.
EHT-MCS (Recommended EHT-MCS for SU-MIMO or MU-MIMO)
  If the Unsolicited MFB subfield is 1 and the UL EHT TB PPDU MFB subfield is 0, and
  1) if SU/MU-MIMO subfield indicates SU-MIMO, the EHT-MCS subfield indicates the recommended EHT-MCS of the PPDU sent to the STA with SU-MIMO, and is set to the EHT-MCS index;
  2) if SU/MU-MIMO subfield indicates MU-MIMO, the EHT-MCS subfield indicates the recommended EHT-MCS of the PPDU sent to the STA with MU-MIMO, and is set to the EHT-MCS index;
  If the Unsolicited MFB is 1 and the UL EHT TB PPDU MFB subfield is 1, and
  1) if SU/MU-MIMO subfield indicates SU-MIMO, the EHT-MCS subfield indicates the recommended EHT-MCS of the EHT TB PPDU sent from the STA in SU-MIMO, and is set to the EHT-MCS index;

2) if SU/MU-MIMO subfield indicates MU-MIMO, the EHT-MCS subfield indicates the recommended EHT-MCS of the EHT TB PPDU sent from the STA in MU-MIMO, and is set to the EHT-MCS index;

if the Unsolicited MFB is 0 and the MRQ is 0, the EHT-MCS subfield indicates the recommended EHT-MCS to the PPDU sent to the STA for either SU-MIMO or MU-MIMO that can be identified by MSI.

Otherwise, this subfield is reserved.

RU Allocation/(Partial RU Allocation, SU/MU-MIMO) (RU of the recommended EHT-MCS/RU/MRU specified by MFB requester to get feedback and SU/MU-MIMO type)

If the BW subfield is set to 0 (indicating the PPDU bandwidth of recommended EHT-MCS/RU/MRU to be 20 MHz), this subfield contains Partial RU Allocation and SU/MU-MIMO subfields that include 8 bits and 1 bit respectively as described previously with reference to FIG. 10A.

Partial RU Allocation subfield contains B7-B0 out of B8-B0 of RU Allocation subfield specified in RU Allocation subfield in 802.11be D1.1 and can indicate all RU/MRU specified within PPDU BW of 20 MHz.

SU/MU-MIMO subfield indicates the recommended EHT-MCS with SU-MIMO or MU-MIMO applies to the PPDU. Set to 0 to indicate SU-MIMO; set to 1 to indicate MU-MIMO.

If the BW subfield is set to 1, 2, 3, 4 or 5 (indicating the PPDU bandwidth of recommended EHT-MCS/RU/MRU to be 40, 80, 160, 320-1 or 320-2 MHz), this subfield contains RU Allocation only as described above with reference to FIG. 10B specified in RU Allocation subfield in 802.11be D1.1.

If the Unsolicited MFB is 1 and the UL EHT TB PPDU MFB is 0, this (Partial) RU Allocation subfield indicates the RU/MRU for which the recommended EHT-MCS applies to the PPDU sent to the STA.

If the Unsolicited MFB is 1 and the UL EHT TB PPDU MFB is 1, this (Partial) RU Allocation indicates the RU/MRU for which the recommended EHT-MCS applies to the EHT TB PPDU sent from the STA and that the actual allocation of the RU/MRU can be ignored by the recipient.

If the Unsolicited MFB is 0 and the MRQ is 1, this (Partial) RU Allocation subfield indicates the RU/MRU requested by the MFB requester to get feedback.

The RU Allocation is interpreted with the PPDU BW to specify the RU/MRU.

Otherwise, this subfield is reserved.

BW (PPDU Bandwidth of the recommended EHT-MCS/ PPDU Bandwidth specified by MFB requester to get feedback)

If the Unsolicited MFB is 1 and the UL EHT TB PPDU MFB is 0, the BW indicates the bandwidth for which the recommended EHT-MCS applies to the PPDU sent to the STA.

If the Unsolicited MFB is 1 and the UL EHT TB PPDU MFB is 1, the BW indicates the bandwidth for which the recommended EHT-MCS applies to the EHT TB PPDU sent from the STA.

If the Unsolicited MFB is 0 and the MRQ is 1, the BW indicates the PPDU bandwidth requested by the MFB requester to get feedback.

Set to 0 for 20 MHz. Set to 1 for 40 MHz. Set to 2 for 80 MHz. Set to 3 for 160 MHz. Set to 4 for 320-1 MHz. Set to 5 for 320-2 MHz.

Otherwise, this subfield is reserved.

Tx Beamforming (Transmission type of the measured PPDU):

If the Unsolicited MFB subfield is 1 and the UL EHT TB PPDU MFB subfield is 0, then the Tx Beamforming subfield indicates whether or not the PPDU from which the unsolicited MFB was estimated is beamformed.

Set to 0 for non-beamformed PPDU

Set to 1 for beamformed PPDU

Otherwise, this subfield is reserved.

UL EHT TB PPDU MFB (UL EHT TB PPDU MFB indication):

If the Unsolicited MFB subfield is 1, a value of 1 in this subfield indicates that the NSS, EHT-MCS, BW and RU Allocation fields represent the recommended MFB for the EHT TB PPDU sent from the STA.

Otherwise, this subfield is reserved.

MSI/(PPDU Format, Coding Type)/(PPDU Format, SU/MU-MIMO) (MRQ sequence identifier/PPDU Format, Coding Type and SU/MU-MIMO type of the measured PPDU)

If the Unsolicited MFB subfield is 0 and the MRQ subfield is 1, as shown in FIG. 11A this subfield contains a sequence number in the range 0 to 3 that identifies the specific EHT-MCS feedback request.

If the Unsolicited MFB subfield is 0 and the MRQ subfield is 0, as shown in FIG. 11A this subfield contains a sequence number in the range 0 to 3 that responds to the specific solicited EHT-MCS feedback request.

If the Unsolicited MFB subfield is 1 and if the BW subfield is set to 0 (indicating the PPDU bandwidth of recommended EHT-MCS/RU/MRU to be 20 MHz), as shown in FIG. 11B this subfield contains the PPDU Format (1 bit) (set 0 for indication of EHT MU PPDU; set 1 for EHT TB PPDU) and Coding Type (1 bit) (set 0 for indication of BCC; set 1 for LDPC) subfields.

If the Unsolicited MFB subfield is 1 and if the BW subfield is set to 1, 2, 3, 4 or 5 (indicating the PPDU bandwidth of recommended EHT-MCS/RU/MRU to be 40, 80, 160, 320-1 or 320-2 MHz), as shown in FIG. 11C this subfield contains the PPDU Format (1 bit) (set 0 for indication of EHT MU PPDU; set 1 for EHT TB PPDU) and SU/MU-MIMO Type (1 bit) (set 0 for indication of SU-MIMO; set 1 for MU-MIMO) subfields An advantage of the third embodiment includes maintaining the A-Control format unchanged and using only one reserved Control ID for indication of EHT LA control.

It can be seen that in the embodiment described above, the location of the SU/MU-MIMO indicator varies dependent upon the recommended BW, unsolicited MFB. This is to be understood as a specific example. More generally, there is some indicator within the 26 bits of control information of whether the EHT LA parameters apply to SU-MIMO or MU-MIMO. In some embodiments, there may be an exception to the need to include the SU/MU-MIMO indicator in certain cases, for example where the unsolicited MFB subfield is 0 as described above.

EHT Link Adaptation (EHT LA) Using One Control ID Value in A-Control Subfield of the HE Variant HT Control Field—Second Method In accordance with a fourth embodiment, the Control ID value equal to 2 (for HLA in 802.11ax) is used to indicate LA parameters for both HE and HLA. The receiver determines which case is relevant on another basis, for example based on PHY layer parameters such as described for the second embodiment above. Table 4 below shows control ID assignments for this embodiment.

TABLE 4

Control ID and EHT LA in A-Control field in the Fourth Embodiment

| Control ID Value | Meaning | Length of the Control Information subfield (bits) | Content of the Control Information subfield |
|---|---|---|---|
| . . . | | | |
| 2 | HE link adaptation (HLA)/ EHT Link Adaptation (EHT LA) | 26 | when TXVECTOR parameter FORMAT indicates an HE PPDU, use HLA when TXVECTOR parameter FORMAT indicates an EHT PPDU, use EHT LA for SU MIMO or MU MIMO configuration (see below) |
| . . . | | | |

In a specific example, the format of Control Information subfield in EHT Link Adaptation (EHT LA) is the same as that describe for the third embodiment previously with reference to FIGS. 9, 10 and 11. Furthermore, example definitions of EHT LA parameters in Control Information subfield are as described for the third embodiment above.

An advantage of the fourth embodiment includes maintaining the A-Control format unchanged and reuse Control ID value of 2 for indication of EHT LA control.

It can be seen that the third and fourth embodiments share the feature that a single ID is used for EHT LA. This is either a reserved control ID (third embodiment), or control ID 2 (fourth embodiment).

Figure 12:
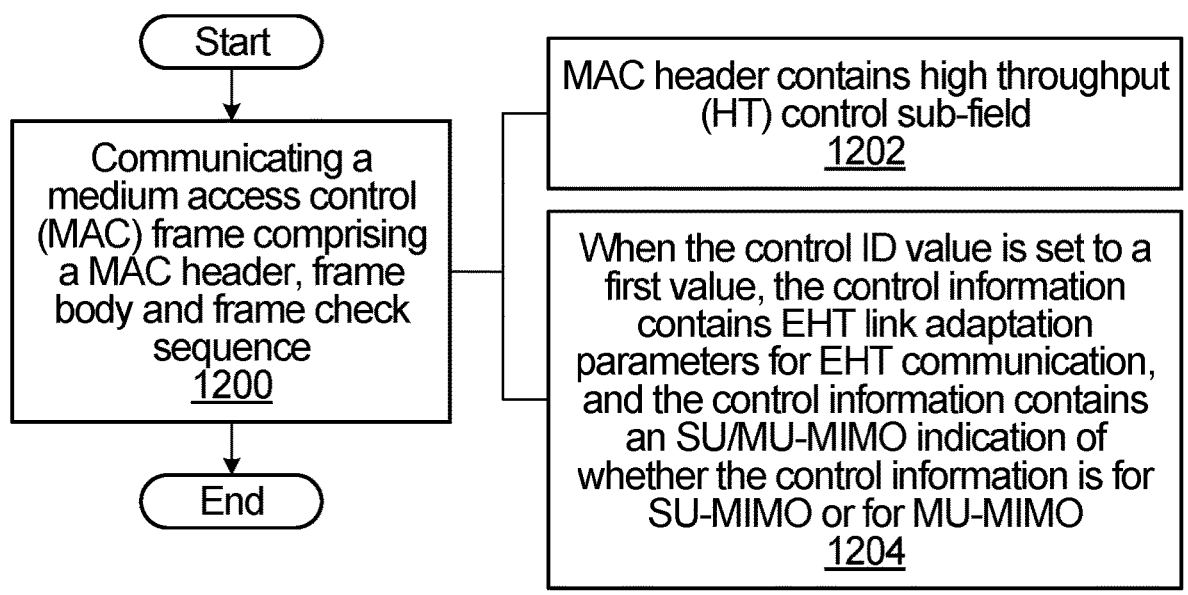
FIG. 12 is a flowchart of another method of communicating EHT LA parameters.

A flowchart of a method that encompasses the third and fourth embodiment is depicted in FIG. 12. The method begins in block 1200 with communicating, by a wireless communication device, a medium access control (MAC) frame comprising a MAC header, frame body and frame check sequence. The MAC header has a high throughput (HT) control sub-field, the HT control sub-field containing a control ID value and control information, as indicated at 1202. When the control ID value is set to a first value, the control information contains EHT link adaptation parameters for EHT communication, and the control information contains an SU/MU-MIMO indication of whether the control information is for SU-MIMO or for MU-MIMO, as indicated at 1204. The first value is 2 in some embodiments, and in others, it is a one of 9, 11, 12, 13, 14. Many examples are described above for the indication of whether the control information is for SU-MIMO or for MU-MIMO, any of which can be applied here.

In FIG. 12, The communicating can involve receiving by an access point. Alternatively communicating can involve transmitting by an access point. The communicating can involve receiving by a non-AP station. Alternatively communicating can involve transmitting by a non-AP station.

In some embodiments, a transmitter, which may be an AP or a non-AP STA for example, determines EHT LA link adaptation information for EHT transmission for SU-MIMO or MU-MIMO. Detailed examples of EHT LA parameters are described above. Determining the EHT LA parameters can involve making channel measurements. The transmitter then sends the EHT LA information using one of the methods described above. After that, data transmission takes place using the updated EHT LA parameters. This is done until the EHT LA parameters are updated again.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
communicating, by a wireless communication device, a medium access control (MAC) frame comprising a MAC header, frame body and frame check sequence;
the MAC header comprising:
a high throughput (HT) control sub-field, the HT control sub-field containing a control ID value and control information;
wherein when the control ID value is set to a first value, the control information is extremely high throughput (EHT) link adaptation parameters for EHT communication for single user-multiple input multiple output (SU-MIMO), the link adaptation parameters for EHT for SU-MIMO comprising a first parameter that indicates a recommended number of spatial streams for SU-MIMO and a second parameter that indicates a recommended modulation and coding scheme (MCS) for SU-MIMO;
wherein when the control ID value is set to a second value, the control information is EHT link adaptation parameters for EHT communication for multi-user-multiple input multiple output (MU-MIMO);
the link adaptation parameters for EHT for MU-MIMO comprising a first parameter that indicates a recommended number of spatial streams for MU-MIMO and a second parameter that indicates a recommended MCS for MU-MIMO.

2. The method of claim 1 wherein the first value is one of 9, 11, 12, 13, 14 and the second value is a different one of 9, 11, 12, 13, 14.

3. The method of claim 1 wherein the first value is 2 and the second value is one of 9, 11, 12, 13, 14, wherein when the first value is 2, the method further comprises communicating an indication at a physical layer that the MAC frame is a frame of the EHT protocol.

4. The method of claim 1 wherein communicating comprises transmitting by an access point (AP).

5. The method of claim 1 wherein communicating comprises receiving by an access point.

6. The method of claim 1 wherein communicating comprises transmitting by a non-access point (AP) station (STA).

7. The method of claim 1 wherein communicating comprises receiving by a non-AP station (STA).

8. The method of claim 1 wherein the HT control sub-field comprises a high efficiency (HE) variant HT control field, the HE variant HT control field including an A-control subfield, wherein the A-control subfield contains said control ID and said control information.

9. A method comprising:
communicating, by a wireless communication device, a medium access control (MAC) frame comprising a MAC header, frame body and frame check sequence;

the MAC header comprising:
a high throughput (HT) control sub-field, the HT control sub-field containing a control ID value and control information;
wherein when the control ID value is set to a first value, in a case where the MAC frame is a frame of an extremely high throughput (EHT) protocol, the control information contains EHT link adaptation parameters for EHT communication, and the control information contains a single user/multiple user-multiple input multiple output (SU/MU-MIMO) indication of whether the control information is for single user-multiple input multiple output (SU-MIMO) or for multiple user-multiple input multiple output (MU-MIMO);
wherein when the control ID value is set to the first value, in a case where the MAC frame is a frame of a high efficiency (HE) protocol, the control information contains HE link adaptation parameters for HE communication;
wherein the first value is 2.

10. The method of claim 9 wherein:
the control information includes a bandwidth sub-field indicating a recommended bandwidth, and an resource unit (RU) allocation/(partial RU allocation, SU/MU-MIMO indication) subfield defined as follows:
when the recommended physical layer protocol data unit (PPDU) bandwidth is larger than 20 MHz, an resource unit (RU) allocation/(partial RU allocation, SU/MU-MIMO indication) subfield containing only RU allocation;
when the recommended PPDU bandwidth equals 20 MHz, an resource unit (RU) allocation/(partial RU allocation, SU/MU-MIMO indication) subfield containing a partial RU allocation and the SU/MU-MIMO indication.

11. The method of claim 9 wherein:
the control information includes an unsolicited modulation and coding scheme feedback (MFB) sub-field, a bandwidth sub-field indicating a recommended physical layer protocol data unit (PPDU) bandwidth, and a modulation and coding scheme Request Sequence Identifier (MSI)/PPDU Format, Coding Type)/(PPDU Format, SU/MU-MIMO indication) subfield defined as follows:
when the unsolicited MFB sub-field is 0, MSI/(PPDU Format, Coding Type)/(PPDU Format, SU/MU-MIMO indication) containing MSI;
when the unsolicited MFB sub-field is 1 and the recommended PPDU bandwidth is 20 MHz, the MSI/(PPDU Format, Coding Type)/(PPDU Format, SU/MU-MIMO indication) containing PPDU format and coding type;
when the unsolicited MFB sub-field is 1 and the recommended PPDU bandwidth when the unsolicited MFB sub-field is 1 and the recommended PPDU bandwidth is >20 MHz, the MSI/(PPDU Format, Coding Type)/ (PPDU Format, SU/MU-MIMO indication) containing PPDU format and the SU/MU-MIMO indication.

12. The method of claim 9, the method further comprising in the case that the MAC frame is a frame of the HE protocol communicating an indication at a physical layer that the MAC frame is a frame of the HE protocol and in the case that the MAC frame is a frame of the EHT protocol communicating an indication at the physical layer that the MAC frame is a frame of the EHT protocol.

13. The method of claim 9 wherein communicating comprises receiving by a non-AP station (STA).

14. A method comprising:
communicating, by a wireless communication device, a medium access control (MAC) frame comprising a MAC header, frame body and frame check sequence;
the MAC header comprising:
a high throughput (HT) control sub-field, the HT control sub-field containing a control ID value and control information;
wherein when the control ID value is set to a first value, the control information contains EHT link adaptation parameters for EHT communication, and the control information contains a single user/multiple user-multiple input multiple output (SU/MU-MIMO) indication of whether the control information is for single user-multiple input multiple output (SU-MIMO) or for multiple user-multiple input multiple output (MU-MIMO);
wherein communicating comprises transmitting by an access point (AP).

15. A method comprising:
communicating, by a wireless communication device, a medium access control (MAC) frame comprising a MAC header, frame body and frame check sequence;
the MAC header comprising:
a high throughput (HT) control sub-field, the HT control sub-field containing a control ID value and control information;
wherein when the control ID value is set to a first value, the control information contains EHT link adaptation parameters for EHT communication, and the control information contains a single user/multiple user-multiple input multiple output (SU/MU-MIMO) indication of whether the control information is for single user-multiple input multiple output (SU-MIMO) or for multiple user-multiple input multiple output (MU-MIMO);
wherein communicating comprises receiving by an access point.

16. A method comprising:
communicating, by a wireless communication device, a medium access control (MAC) frame comprising a MAC header, frame body and frame check sequence;
the MAC header comprising:
a high throughput (HT) control sub-field, the HT control sub-field containing a control ID value and control information;
wherein when the control ID value is set to a first value, the control information contains EHT link adaptation parameters for EHT communication, and the control information contains a single user/multiple user- multiple input multiple output (SU/MU-MIMO) indication of whether the control information is for single user-multiple input multiple output (SU-MIMO) or for multiple user-multiple input multiple output (MU-MIMO);
wherein communicating comprises transmitting by a non-access point (AP) station (STA).

17. An access point comprising a processor and memory, the access point configured to execute a method comprising:
communicating, by the access point, a medium access control (MAC) frame comprising a MAC header, frame body and frame check sequence;
the MAC header comprising:
a high throughput (HT) control sub-field, the HT control sub-field containing a control ID value and control information;
wherein when the control ID value is set to a first value, in a case where the MAC frame is a frame of an extremely high throughput (EHT) protocol, the control information contains EHT link adaptation parameters for EHT communication, and the control information contains a single user/multiple user-multiple input multiple output (SU/MU-MIMO) indication of whether the control information is for single user-multiple input multiple output (SU-MIMO) or for multiple user- multiple input multiple output (MU-MIMO);

wherein when the control ID value is set to the first value, in a case where the MAC frame is a frame of a high efficiency (HE) protocol, the control information contains HE link adaptation parameters for HE communication;

wherein the first value is 2.

18. A non-access point (AP) station comprising a processor and memory, the non-AP station configured to execute a method comprising:

communicating, by the non-AP station, a medium access control (MAC) frame comprising a MAC header, frame body and frame check sequence;

the MAC header comprising:

a high throughput (HT) control sub-field, the HT control sub-field containing a control ID value and control information;

wherein when the control ID value is set to a first value, in a case where the MAC frame is a frame of an extremely high throughput (EHT) protocol, the control information contains EHT link adaptation parameters for EHT communication, and the control information contains a single user/multiple user- multiple input multiple output (SU/MU-MIMO) indication of whether the control information is for single user-multiple input multiple output (SU-MIMO) or for multiple user-multiple input multiple output (MU-MIMO);

wherein when the control ID value is set to the first value, in a case where the MAC frame is a frame of a high efficiency (HE) protocol, the control information contains HE link adaptation parameters for HE communication;

wherein the first value is 2.

\* \* \* \* \*